United States Patent
Underwood et al.

(10) Patent No.: US 6,707,360 B2
(45) Date of Patent: Mar. 16, 2004

(54) SWITCHABLE PERMANENT MAGNETIC DEVICE

(75) Inventors: Perry J Underwood, Lake Cathie (AU); Franz Kocijan, Pappinbarra (AU)

(73) Assignee: The Aussie Kids Toy Company Pty Ltd, New South Wales (AU)

( * ) Notice: Subject to any disclaimer, the term of this patent is extended or adjusted under 35 U.S.C. 154(b) by 0 days.

(21) Appl. No.: 09/951,905

(22) Filed: Sep. 14, 2001

(65) Prior Publication Data

US 2002/0105400 A1 Aug. 8, 2002

Related U.S. Application Data

(63) Continuation-in-part of application No. PCT/AU00/01505, filed on Dec. 6, 2000.

(51) Int. Cl.$^7$ .............................. H01F 7/02; H01F 7/20
(52) U.S. Cl. ............................ 335/288; 335/285; 269/8
(58) Field of Search ................. 335/285–288, 335/295, 289, 291; 295/65.5

(56) References Cited

U.S. PATENT DOCUMENTS

| | | |
|---|---|---|
| 3,121,193 A | 2/1964 | Engelsted |
| 3,627,959 A | 12/1971 | Chapell |
| 3,635,511 A | 1/1972 | Waller |
| 3,791,687 A | 2/1974 | Schroeder |
| 3,812,629 A * | 5/1974 | Campbell .................. 451/364 |

(List continued on next page.)

FOREIGN PATENT DOCUMENTS

| | | |
|---|---|---|
| CN | 1104989 | 7/1995 |
| DE | 3040582 | 5/1982 |
| DE | 19710186 | 9/1998 |
| EP | 509937 | 10/1992 |
| EP | 0 559 483 A1 | 8/1993 |

(List continued on next page.)

OTHER PUBLICATIONS

International Search Report in International Application No. PCT/AU00/01505 citing documents PR–WR, GR (p. 2), HR (p. 2), and IR (p. 2) listed on pp. 1 and 2 of this form PTO 1449, Mar. 5, 2001, Australian Patent Office.

*Primary Examiner*—Lincoln Donovan
*Assistant Examiner*—Bernard Rojas
(74) *Attorney, Agent, or Firm*—Pillsbury Winthrop LLP

(57) ABSTRACT

A switchable magnetic device includes a first magnet (10) and a second magnet (11), both of which are essentially cylindrical. Magnets (10,11) are housed in a housing made from pole pieces (12,13). Pole pieces (12, 13) are ferromagnetic. Lower magnet (10) is fixedly mounted in the housing whilst upper magnet (11) can rotate within the housing. Upper magnet (11) is formed with notches or grooves (14, 15) along its vertical side walls. These notches or grooves (14, 15) receive downwardly depending arms (16, 17) of bar (18). Bar (18) is received inside a groove (19) formed on boss (20). Boss (20) is connected to a short bar (21) that, in turn, is fixedly connected to a handle or lever (22). By this means, rotation of handle or lever (22) causes rotation of second magnet (11). When the upper magnet (11) is positioned such that its north pole substantially overlies the south pole of lower magnet (10) and the south pole of upper magnet (11) substantially overlies the north pole of lower magnet (10), the first and second magnets act as an internal active magnetic shunt and as a result the external magnetic field strength from the device is quite low. Rotating the upper magnet (11) 180° about its axis of rotation brings the magnets into alignment such that the respective north and south poles of the upper magnet (11) substantially overlie respective north and south poles of lower magnet (10). In this alignment, the external magnet field from the device is quite strong and the device can be affixed to surfaces or objects.

48 Claims, 11 Drawing Sheets

U.S. PATENT DOCUMENTS

| | | |
|---|---|---|
| 4,055,824 A | 10/1977 | Baermann |
| 4,099,755 A | 7/1978 | Anderson |
| 4,250,478 A | 2/1981 | Cardone et al. |
| 4,251,791 A | 2/1981 | Yanagisawa et al. |
| 4,270,781 A | 6/1981 | Nishimura |
| 4,314,219 A | 2/1982 | Haraguchi |
| 4,329,673 A | 5/1982 | Uchikune et al. |
| 4,331,355 A | 5/1982 | Okuno |
| 4,419,644 A | 12/1983 | Baermann |
| 4,465,993 A | 8/1984 | Braillon |
| 4,468,649 A | 8/1984 | Matsuhashi |
| 4,506,407 A | 3/1985 | Downey |
| 4,603,563 A | 8/1986 | Mochida et al. |
| 4,639,170 A | 1/1987 | Palm |
| 4,822,085 A | 4/1989 | Guity-Mehr |
| 5,114,195 A | 5/1992 | Martin et al. |
| 5,166,654 A | 11/1992 | Doyelle |
| 5,266,914 A * | 11/1993 | Dickson et al. ............. 335/295 |
| 5,836,049 A | 11/1998 | Chiang |
| 5,844,458 A | 12/1998 | Bartholomew et al. |
| RE36,652 E | 4/2000 | Wang |
| 6,279,218 B1 | 8/2001 | Lezuch et al. |
| 6,283,767 B1 | 9/2001 | Sornes |
| 2001/0026204 A1 | 10/2001 | Petro |

FOREIGN PATENT DOCUMENTS

| | | | |
|---|---|---|---|
| GB | 2095135 | 9/1982 | |
| GB | 2 121 238 A | 12/1983 | |
| GB | 2130797 | 6/1984 | |
| GB | 2 130 797 A | 6/1984 | |
| GB | 2211356 A * | 6/1989 | ........... B25B/11/00 |
| IE | 71635 | 2/1997 | |
| SU | 1211824 | 2/1986 | |
| SU | 1763341 A1 | 9/1992 | |
| WO | 97/03911 | 2/1997 | |

* cited by examiner

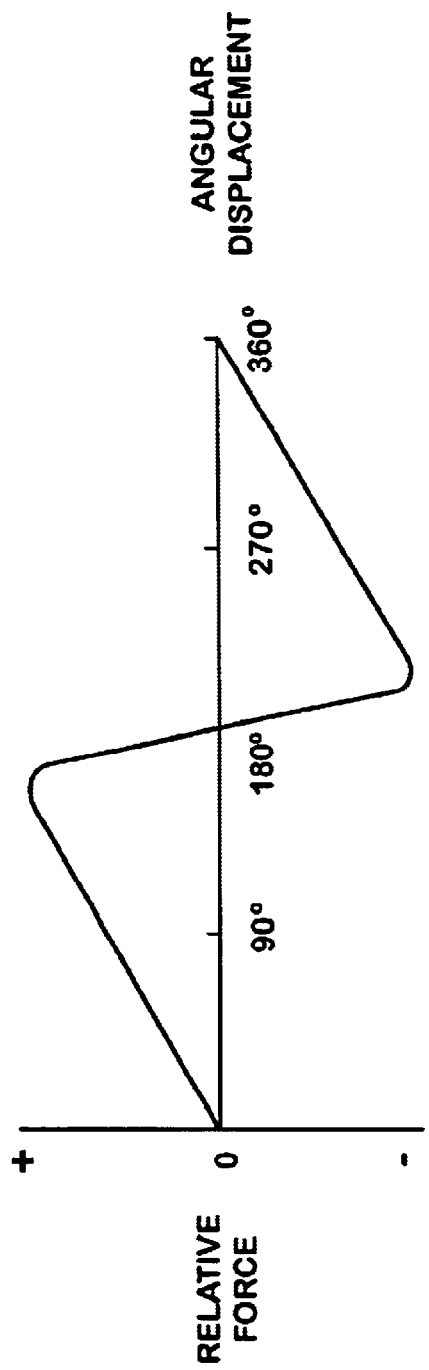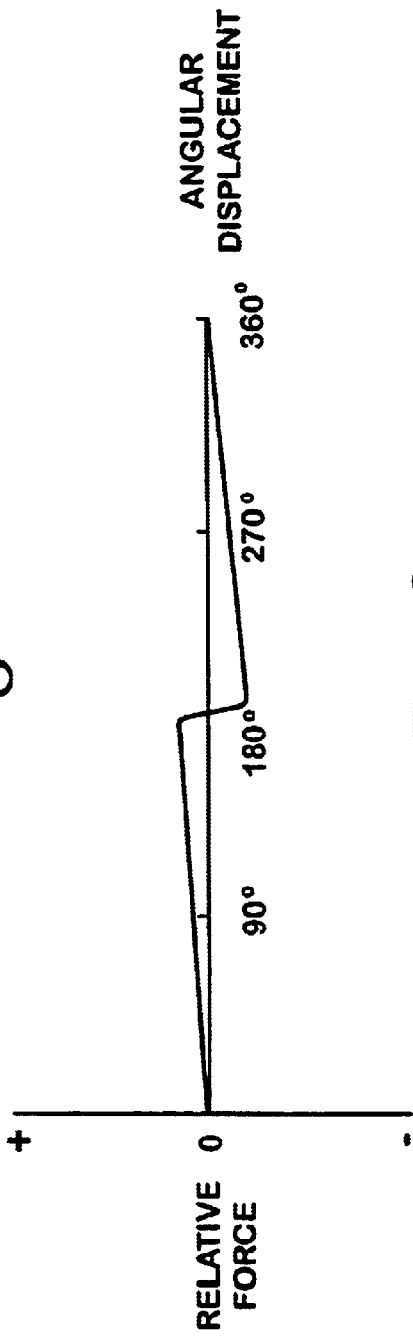

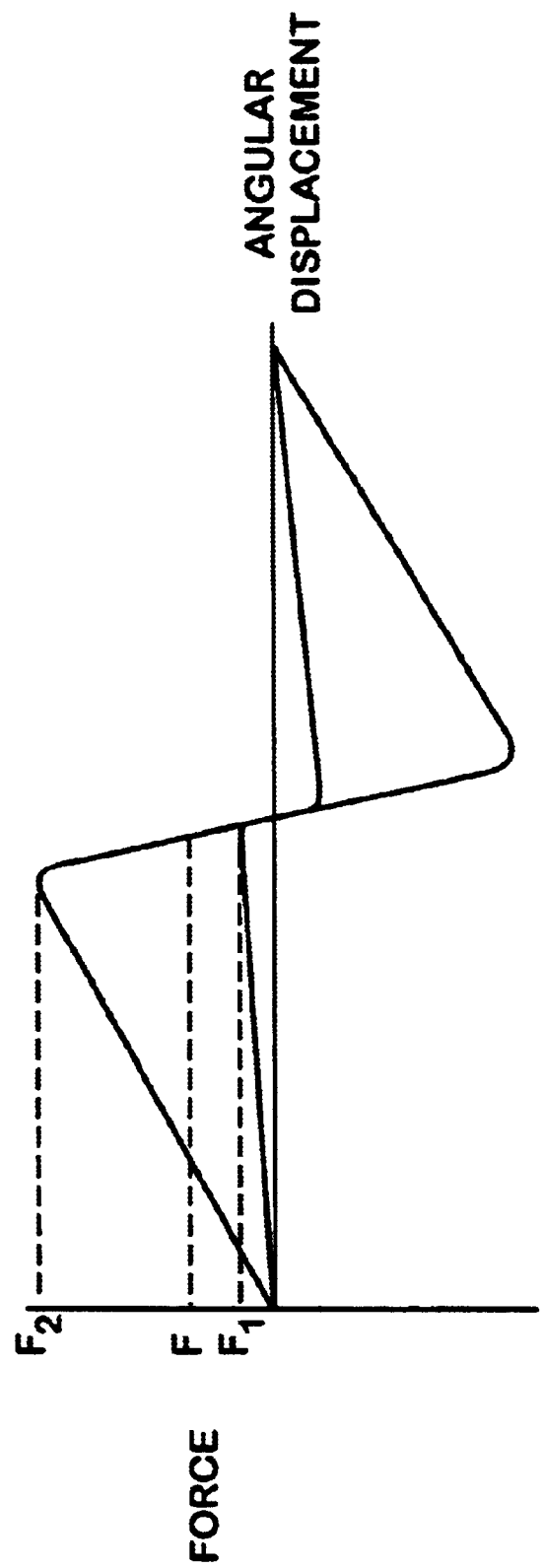

SWITCHABLE PERMANENT MAGNETIC DEVICE

CROSS REFERENCE TO RELATED APPLICATIONS

The present application is a Continuation-in-Part of international application PCT/AU00/01505 with an international filing date of Dec. 6, 2000. The international application claims priority to Australian application PQ4466, filed on Dec. 6, 1999.

FIELD OF THE INVENTION

The present invention relates to a magnetic device. In particular, the present invention relates to a switchable permanent magnet device.

BACKGROUND OF THE INVENTION

Permanent magnets consist of a ferromagnetic material that has been suitably magnetized. Permanent magnets provide a magnetic field without requiring an electric current. Permanent magnets are attracted to and can be firmly affixed ferromagnetic materials. However, permanent magnets suffer from the drawback that their energy output is fixed and they cannot be employed if a variation in magnetic field strength is required.

Due to the above-mentioned drawback with permanent magnets, it has been customary to control magnetic fields by using electric current or electromagnets. The strength and orientation of the magnetic fields of electromagnets can be controlled successfully by controlling the strength and direction of the electric current. However, this introduces the necessity of having to provide a constantly available source of electric current and associated wiring. This can cause complexity and potential hazards.

A number of attempts have also been made to arrange permanent magnets to enable variations to be achieved in magnetic field strength. A number of different approaches have been tried to produce practical solutions. However, these approaches resulted in bulky constructions, complicated constructions, or devices that were expensive to manufacture. The prior art devices also paid little attention to achieving a good holding force between the devices and substrates under conditions where an incomplete external magnetic circuit existed, for example, where there were gaps between the magnet and the keeper, or where the keeper or substrate had a low permeability, such as thin ferrous sheet metal. To achieve good holding forces in the prior art devices, it was necessary that perfect contact between the magnet and the substrate be achieved and that the substrate be of substantial volume to enable a sufficient magnetic flux to be established. This, of course, could be difficult to achieve in practice.

U.S. Pat. No. 3,121,193 (Engelstead) describes a permanent magnet-type work holding device especially a chuck that is adapted for use in turning operations. The device of Engelstead consists of arrays of permanent magnets, which magnets are of generally rectangular configuration. In order to adjust the field strength an array of pole pieces was moved away from and out of alignment with another array of pole pieces.

U.S. Pat. No. 4,241,791 (Yanagisawa) describes a magnetic base which is switchable between an engaged position and releaseable from a substance by an operation of a single rotating permanent magnet disposed notably in a magnetic circuit block. The rotary magnet in Yanagisawa is rotated by 90° to switch between the exited and the unexcited states. This device, relies upon using passive external magnetic members of substantial mass (12 and 14 of FIG. 1 of Yanagisawa) having a rotatable magnet (20) positioned therein.

United Kingdom patent application no 2130797 relates to a permanent magnet chuck capable of switching from an excited state to an unexcited state by changing the relative positional relationship between fixed permanent magnets and movable permanent magnets. The movable permanent magnets move laterally with respect to the fixed magnets in order to vary the magnetic field.

SUMMARY OF THE INVENTION

It is an object of the present invention to provide a switchable magnetic device having improved properties.

In a first aspect, the present invention provides a switchable magnetic device comprising a housing, a first permanent magnet, a second permanent magnet, said first and second permanent magnets being essentially cylindrically shaped, said first and second permanent magnets being diametrically polarised, said first and second permanent magnets being mounted within the housing such that the first and second permanent magnets are rotatable relative to each other, and actuation means for causing relative rotation of the first and second permanent magnets, wherein said device presents a relatively strong external magnetic field when said first and second permanent magnets are positioned relative to each other such that a north and south poles of the first magnet are in substantial alignment with respective north and south poles of the second magnet, and the device presents a relatively weak external magnetic field when the first and second magnets are positioned relative to each other such that the north pole of the first magnet is in substantial alignment with the south pole of the second magnet and vice versa.

Preferable, the first and second magnets are substantially disc-shaped.

Preferably, the first magnet and the second magnet are mounted in the housing such that a face of the first magnet is opposed to a face of the second magnet. Most preferably, one magnet is mounted above the other magnet.

It is preferred that one magnet is fixedly mounted in the housing and that the other magnet is able to rotate in the housing. However, it will be appreciated that relative rotation between the magnets can also result from both magnets being rotatable. Accordingly, the present invention also encompasses devices in which both magnets can rotate.

The housing may comprise a pair of passive ferromagnetic elements which are magnetically separated, for example, by an air gap or by magnetically high reluctance material(s). The housing most suitably defined in chamber in which the first and second magnets are positioned. The chamber may have open ends or, more preferably, is a closed chamber. Chamber closing members are suitably used to close the chamber.

In another embodiment, the housing is made as a unitary construction or from a single piece of material. In this embodiment, it is preferred that there be two portions of the housing having reduced cross sectional area such that the housing acts as two passive poles. Alternatively, portions of the housing may be treated such that the portions become non-magnetic to thereby result in the housing acting as two passive poles.

The housing is preferably made from a material having a low magnetic reluctance. Soft steel, iron or permalloys are examples of suitable materials for the housing.

The housing most preferably comprises a pair of passive poles. The strength of the external magnetic field can be maximised by shaping the pair of passive poles such that they reflect the magnetic field strength around the perimeter of the first and second permanent magnets.

The first and second magnets are preferably substantially disc-shaped. Most preferably, the first and second magnets are essentially cylindrical in shape and the height of the cylinder is less than the diameter of the cylinder. It will be appreciated that the first and second magnets need not be exactly cylindrical and that slight variations from a circular cross-section also fall within the scope of the present invention. The height of the magnets may vary over a wide range, and the ratio of diameter to height may also vary over a wide range.

The first and second magnets are also diametrically magnetised. By that, it is meant that the north pole region is separated by a diameter of the cylindrical surface of the magnet from the south pole region. The north pole region and south pole region both exist on the upper and lower substantially circular faces of the magnet and extend through the length or height of the magnet.

The first and second magnets may be essentially identical to each other.

Alternatively, the first and second magnets may have different magnetic properties. The magnets may have the same or different physical dimensions to each other. Varying the magnetic properties or the physical dimensions of the first and second magnets can be used in some embodiments of the invention to vary magnetic switching properties.

As mentioned earlier, it is preferred that one magnet is fixed in the housing and one magnet can rotate in the housing. It is especially preferred that the rotatable magnet can rotate about the centre point of its essentially circular faces. In this fashion, the requirement for large clearances between the inner walls of the housing and the rotatable magnet are avoided. In this embodiment, the shape of the body of rotation of the rotatable magnet is the same shape as the magnet itself (ie substantially circular in top or plan view) and thus the magnet can rotate and yet retain its positioning relative to the walls of the housing.

The actuation means for causing relative rotation of the magnets preferably comprises a handle or knob being in connection with one of the magnets. The handle or knob may be connected to the one magnet by one or more intermediate members.

The handle or knob may be rotated manually, electrically, pneumatically, hydraulically, by the action of expansion of a bimetallic strip, or indeed by any other suitable method The handle may comprise a torque sensitive lever that does not allow a torque in excess of a predetermined amount to be applied to the one magnet. In this regard, when there is no external load applied to the device, it is difficult to switch device between active and inactive states. Use of a torque sensitive lever as part of the actuation means can result in it being impossible to switch the device between the active and inactive states if no sufficient external magnetic circuit is present.

As mentioned above, the housing preferably includes two passive poles, and it is also preferred that one magnet is fixed in the housing. In this particularly preferred embodiment, the one magnet is fixed in place such that the pole pieces are permanently energised.

The permanent magnets in the first aspect of the present invention may be of any suitable type. The most preferred at present are rare earth magnets because they can have a strong magnetic field. Such magnets also have a high coercivity, which means that they resist becoming demagnetised. It is envisaged that permanent magnet technology will continue to develop and it is likely that more powerful magnets will become available in the future that will be suitable for use in the present invention.

The first and second magnets may be essentially identical to each other. Alternatively, the first and second magnets may have different magnetic properties. The magnets may have the same or different physical dimensions to each other. Varying the magnetic properties or the physical dimensions of the first and second magnets can be used in some embodiments of the invention to vary magnetic switching properties.

The present invention may be used as a switchable magnetic holding device. For example, the device may be used to clasp onto surfaces, especially metal surfaces. In some embodiments, the surface to which the device is affixed is located adjacent or underneath a lower surface of the lower magnet. In other embodiments, the surface to which the device is affixed is located adjacent or beside the side surfaces of the magnets.

Alternatively, the device may be used in applications where mainly use of magnetic field is required or desirable. For example, triggering magnetic sensors, for example, in mines, particle deflection, etc.

In a second aspect, the present invention provides a switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets, wherein in a "fully off" position the north pole of the first magnet is in substantial alignment with the south pole of the second magnet and vice versa such that the device presents a relatively weak external magnetic field and relative rotation of the magnets by 180° moves the magnet to a "fully on" position in which the north pole of the first magnet is positioned in alignment with the north pole of the second magnet such that the device presents a relatively strong external magnetic field, characterised in that a biasing means is operatively associated with said actuation means to bias said magnets away from the fully off position and wherein placing said device on or in close proximity to a ferromagnetic material causes the first and second magnets to switch to a relative orientation such that the device presents a relatively strong external magnetic field.

Preferably said relative orientation comprises the fully on position.

The device of the first aspect of the present invention provides a switchable magnetic device that can automatically switch to an "on" position in which the device presents a relative strong external magnetic field when the device is positioned on or in close proximity to a ferromagnetic material.

In a third aspect, the present invention provides a switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets wherein in a "fully off" position the north pole of the first magnet is in substantial alignment with the south pole of the second magnet and vice versa such that the device presents a relatively weak external magnetic field and relative rotation of the magnets by 180° moves the magnets to a "fully on" position in which the north pole of the first magnet is positioned in alignment with the north pole of the second magnet such that the device presents a relatively strong external field, characterised in that said device further includes rotation limiting means preventing said magnets from reaching the "fully on" position.

In a fourth aspect, the present invention provides a switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets, wherein, in a "fully off" position the north pole of the first magnet is in substantial alignment with the south pole of the second magnet and vice versa such that the device presents a relatively weak external magnetic field and relative rotation of the magnets by 180° moves the magnets to a "fully on" position in which the north pole of the first magnet is positioned in alignment with the north pole of the second magnet such that the device presents a relatively strong external magnetic field, characterised in that relative rotation of the first and second magnets is limited to less than 180° such that said magnets are prevented from reaching the fully on position but said first and second magnets can be rotated to a relative orientation such that the north and south poles of the first magnet are closely but not completely aligned with respective north and south poles of the second magnet such that said device still presents a relatively strong external magnetic field and said device automatically switches to a state where the external magnetic field is relatively weak when said device is removed from contact or removed from close proximity to an external ferromagnetic material.

In a fifth aspect, the present invention provides a switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets wherein in a "fully off" position the north pole of the first magnet is in substantial alignment with the south pole of the second magnet and vice versa such that the device presents a relatively weak external magnetic field and relative rotation of the magnets by 180° moves the magnets to a "fully on" position in which the north pole of the first magnet is positioned in alignment with the north pole of the second magnet such that the device presents a relatively strong external field, characterised in that said device further includes a flexible portion that deforms if the actuation means is actuated in the absence of an external magnetic circuit to thereby limit relative rotation of said magnets, said flexible portion having sufficient yield strength to substantially avoid deformation during actuation of said actuation means in the presence of an external magnetic circuit.

Preferably, said flexible portion is a spring link.

Preferably, said flexible portion can be deformed to a maximum extent, after which continued actuation of the actuation means acts to cause relative rotation of the magnets.

In one embodiment of the fifth aspect of the present invention, if an external magnetic circuit is established and the device switched to the "on" position, the device may remain in the "on" position if the external magnetic circuit is forcibly removed. Thus, the device can act as a "memory" advisor in that its status can tell whether successful contact with an external magnetic circuit was achieved.

In a sixth aspect, the present invention provides a coupling comprising a coupling comprising a first magnetic device and a second magnetic device, the first magnetic device being a switchable magnetic device comprising a first permanent magnet and a second permanent magnet, said first and second permanent magnets being movable relative to each other and actuation means for effecting relative movement between the first and second magnets wherein said first magnetic device presents a relatively strong external magnetic field when the first and second magnets are positioned relative to each other such that north and south poles of the first magnet are in substantial alignment with respective north and south poles of the second magnet and the first magnetic device presents a relatively weak external magnetic field when the north pole of the first magnet is in substantial alignment with the south pole of the second magnet and vice versa, said first magnetic device and said second magnetic device being arranged relative to each other such that said second magnetic device attracts the first magnetic device when the first magnetic device presents a relative weak external magnetic field and said second magnetic device repels said first magnetic device when said first magnetic device presents a relatively strong external magnetic field.

The second magnetic device may be a magnet. Alternatively, the second magnetic device may be a second switchable magnetic device in accordance with any of the first to fifth aspects of the present invention.

The coupling of the sixth aspect of the present invention allows for both positive coupling and positive uncoupling. When the switchable magnetic device is in an "off" position, the second magnetic device attracts the switchable magnetic device and coupling is achieved. When the switchable magnetic device is in the "on" position, the second magnetic device repels the switchable magnetic device and a positive uncoupling can occur.

In all aspects of the present invention, the device may further include a child-proof lock or child-proof catch type arrangement in the actuation means such that some extra manipulation by a user is required before the magnets can be rotated. For example, the actuation means may comprise a knob that must be pushed down before rotational force applied to the knob can be transferred to the magnet(s)). Other arrangements which will be readily apparent to the person of skill in the art will also be readily apparent.

BRIEF DESCRIPTION OF THE DRAWINGS

In order to more fully understand the present invention, a preferred embodiment of the invention will now be described with reference to the accompanying drawings, in which:

FIG. 7 shows a plot of relative force against angular displacement showing the internal forces acting on the device as a function of angular displacement of the magnets relative to each other in the absence of an external magnetic circuit, FIG. 8 is a similar plot to FIG. 7 but shown in the presence of an external magnetic circuit;

FIG. 9 shows a plot of FIGS. 7 and 8 superimposed upon each other with an explanation as to the functioning of the first aspect of the present invention;

DETAILED DESCRIPTION OF THE EMBODIMENTS

Figure 1:
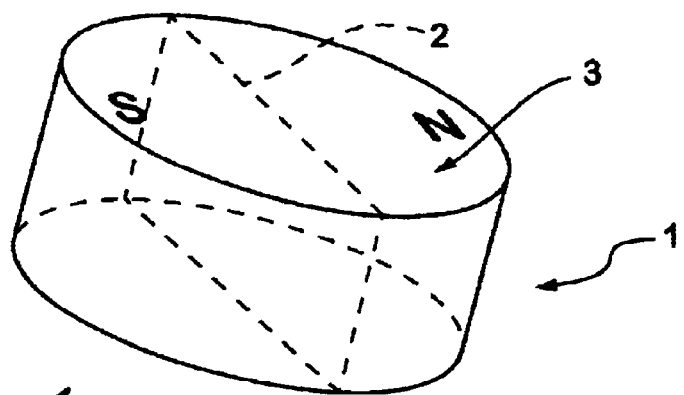
FIG. 1 is a perspective view of an essentially cylindrically-shaped magnet for use in the present invention.

The magnet 1 as shown in FIG. 1 may be described as a cylindrically-shaped magnet. The magnet is diametrically magnetised. By that, is meant that the notional division between the north pole and the south pole of the magnet is achieved by a vertical plane that passes along a diameter 2 of an upper face 3 of the disc magnet 1.

The disc magnet 1 shown in FIG. 1 is preferably a rare-earth type magnet, for example, the magnet 1 may be a neodymium-iron-boron magnet. The present invention also contemplates the use of any other permanent magnet material.

Figure 2:
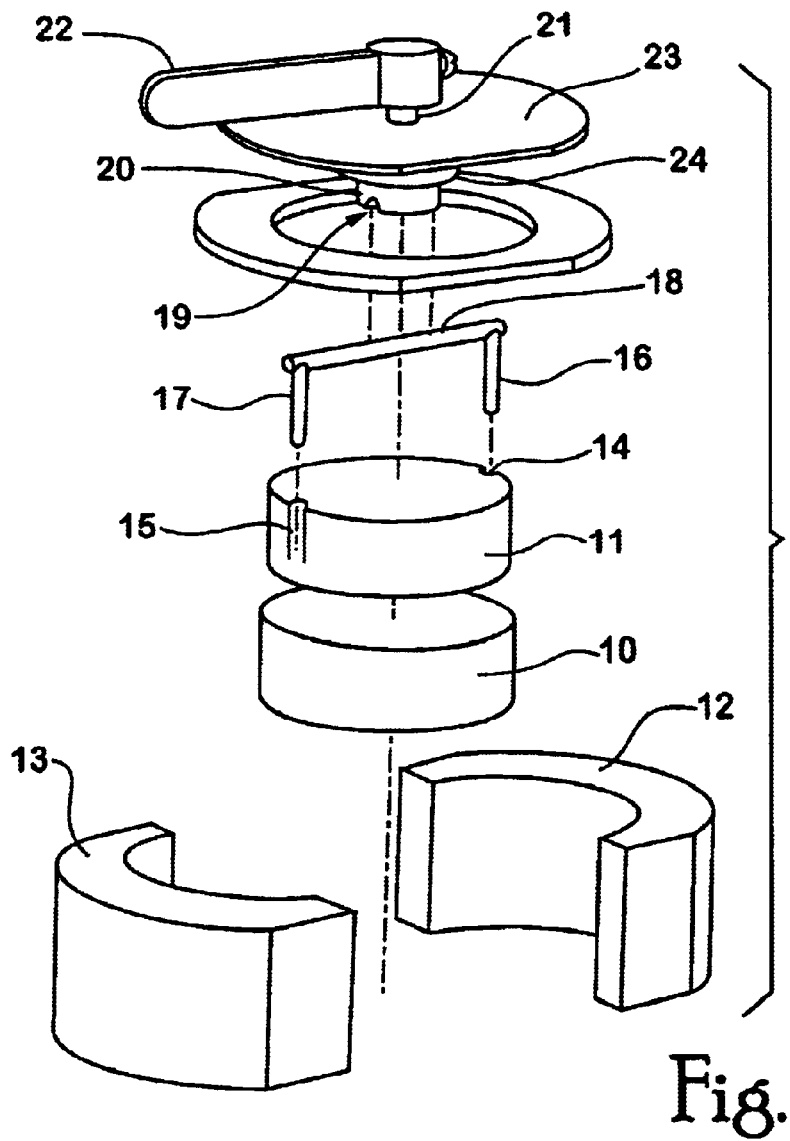
FIG. 2 shows a device in accordance with the present invention apart and in-line for assembly.

Turning to FIG. 2, the device includes a first magnet 10 and a second magnet 11. Both magnets 10, 11 are essentially disc shaped magnets and are similar to magnet 1 as shown in FIG. 1. Magnets 10, 11 are housed in a housing that is made from pole pieces 12, 13. Pole pieces 12, 13 are preferably made from a material that is ferromagnetic with low magnetic reluctance. The pole pieces 12, 13 are arranged such that they fixedly hold lower magnets 10 in a fixed position. Upper magnet 11, however, is able to be rotated within the housing formed by pole pieces 12, 13.

In order to facilitate rotation of upper magnet 11, the magnet 11 is formed with notches or grooves 14, 15 along its vertical side walls. These notches or grooves 14, 15 receive the downwardly depending arms 16, 17 of bar 18. Bar 18 is received inside a groove 19 formed on boss 20. Boss 20 is connected to a short bar 21 that, in turn, is fixedly connected to a handle or lever 22. By this means, rotation of handle of lever 22 causes rotation of second magnet 11. It will be appreciated that second magnet 11 rotates essentially about its centre point.

The device further includes a top cover 23 that is fixedly secured to the housing formed by pole pieces 12 and 13. Cover 23 seals the top of the housing formed by pole pieces 12, 13. It will be noted that boss 20 extends through an opening in top cover 23 and that sealing member 24 assists in forming a water tight and dust proof seal around that opening.

In one embodiment of the device shown in FIG. 2, the lower surface of lower magnet 10 formed part of the lower surface of the device. In this embodiment, the lowest surface of the lower magnet 10 is positioned such that it lies essentially adjacent to the lower surface of respective pole pieces 12, 13.

In another embodiment, the lower surface of the device is provided by a lower cover (not shown).

In either embodiment, it is preferred that the device is essentially sealed, such that it is substantially waterproof and dustproof. This enables the device to be used in harsh environments, such as dusty environments, wet environments, or even fully submerged.

Figure 3:
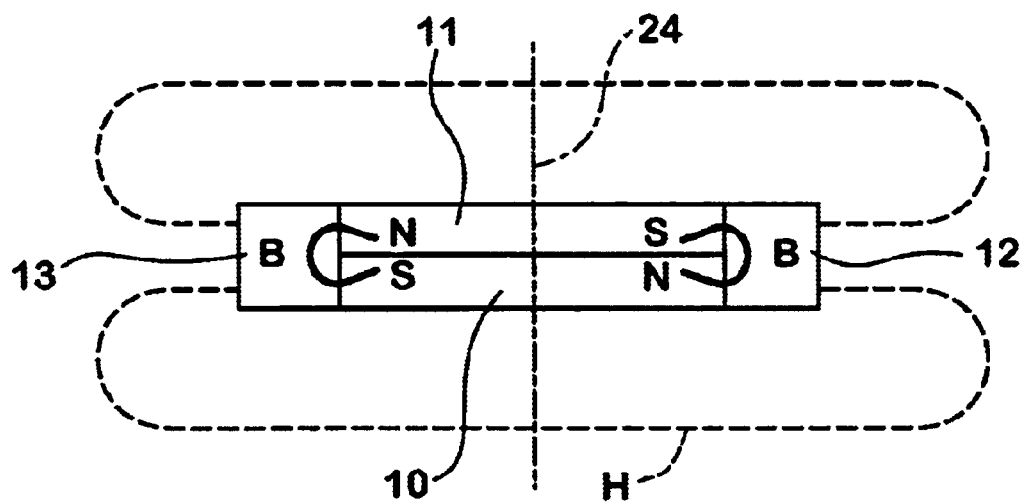
FIGS. 3 and 4 show schematic, cross-sectional side views of the device in accordance with the present invention to demonstrate the principle of the present invention.
Figure 4:
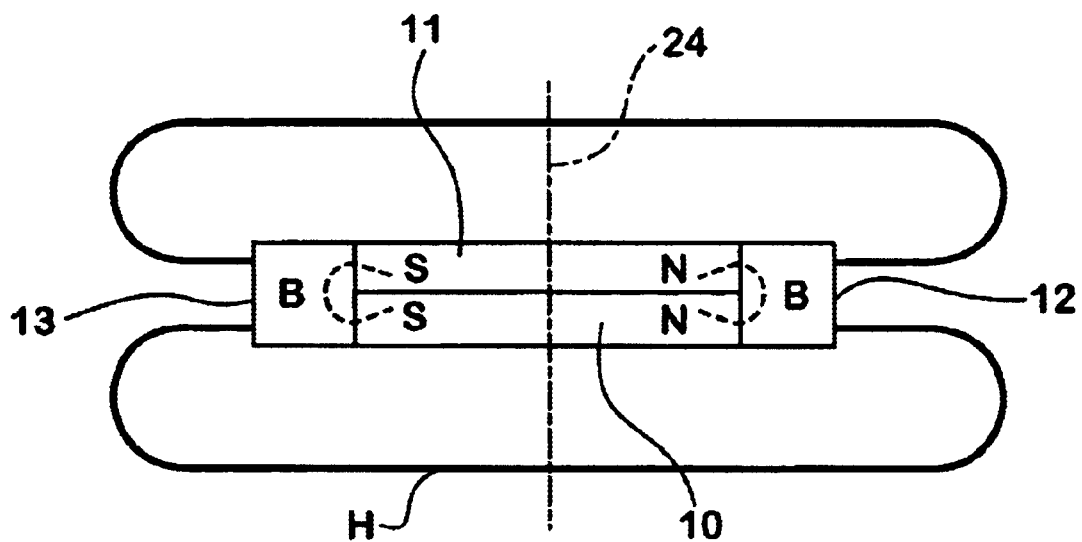
Figure 10:
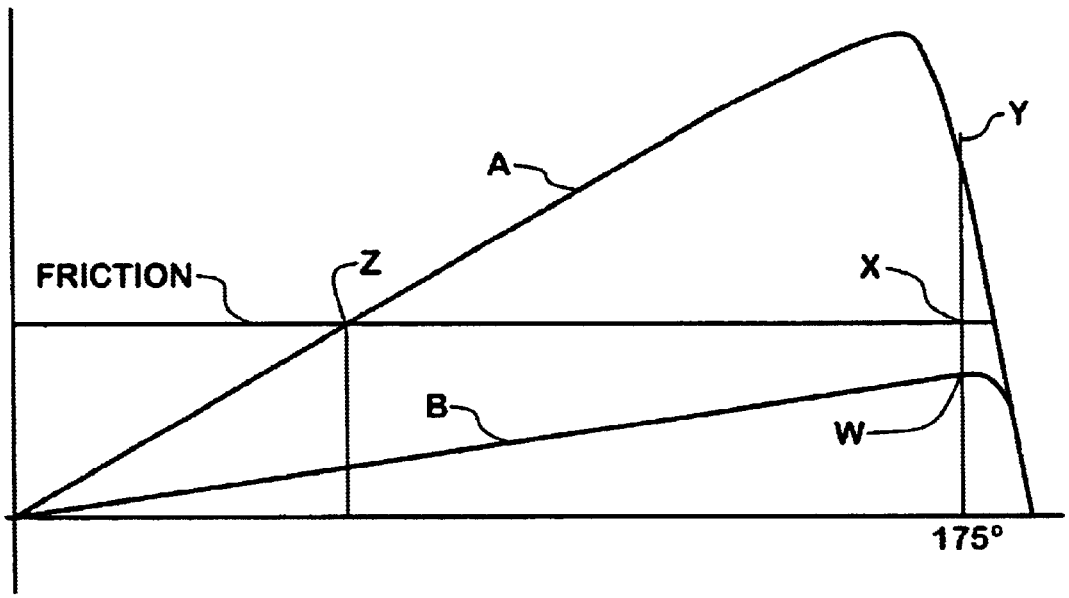
FIG. 10 shows the forces required for an explanation as to the functioning of the third and fourth aspects of the present invention.

The principle of operation of the device in accordance with the present invention is shown in FIGS. 3 and 4. In FIGS. 3 and 4, first magnet 10 and second magnet 11 are mounted such that first magnet 10 is below second magnet 11. The first and second magnets 10, 11 are mounted such that they are in face to face juxtaposition. FIG. 10 is fixedly mounted, whilst second magnet 11 is mounted for rotation about axis of rotation 24.

In FIG. 3, the second magnet 11 has been positioned such that its north pole substantially overlies the south pole of first magnet 10. Similarly, it follows that the south pole of second magnet 11 substantially overlies the north pole of first magnet 10. In this arrangement, the first and second magnet, act as an internal active magnetic shunt and as a result the external magnetic field strength from the device is quite low.

Rotating the upper magnet 11 180° about its axis or rotation brings the magnets into the alignment as shown in FIG. 4. In this alignment, the respective north and south poles of the upper magnet 11 substantially overlie respective north and south poles of lower magnet 10. In this alignment, the external magnet field from the device is quite strong and the device can be firmly attached in ferromagnetic surfaces. The passive poles are important in assisting the magnetic functionality shown in FIGS. 3 and 4.

Figure 5:
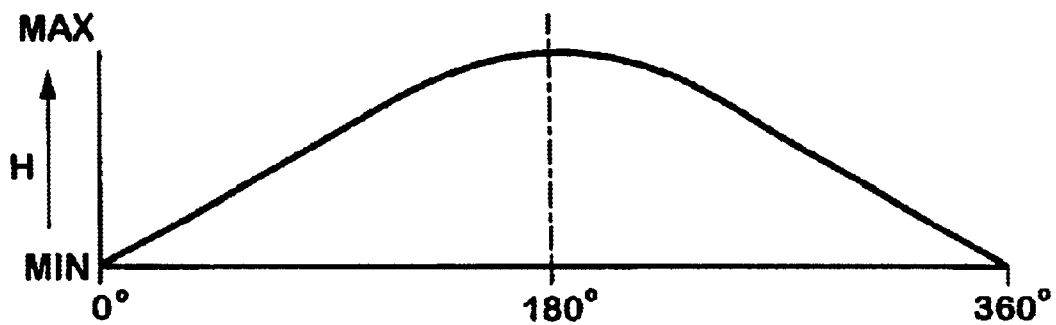
FIG. 5 shows the relationship between the angle of rotation and the external magnetic field in a device in accordance with the present invention.

FIG. 5 shows the analogue relationship between the angle of rotation and the variation of the external magnetic field. The exact characteristics of the curve depend on the way the disc magnets are magnetised in their physical shape as well as the shape of the poles (12, 13). Variation of the ratio of the magnetic energy products of the magnetic discs 10, 11 can achieve further modification of the curve in FIG. 5 to suit particular applications.

Further increases in external magnetic field strengths can be accomplished by shaping the wall thickness of the pole pieces 12, 13 in such a way that they reflect the variation of the magnetic field strength around the perimeter of the permanently magnetised discs 10, 11.

Figure 6:
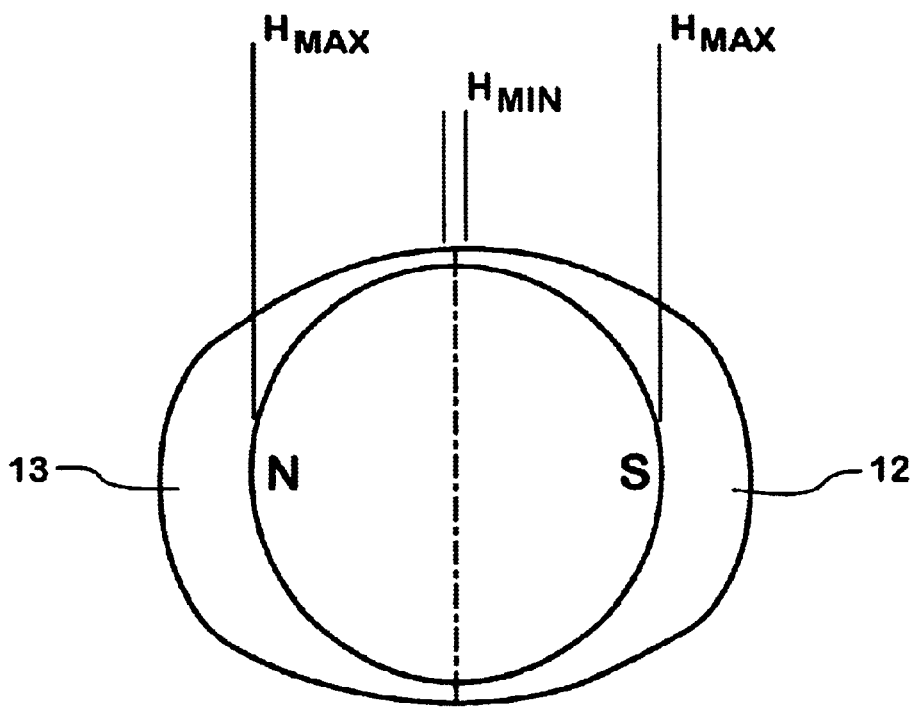
FIG. 6 shows an end view of a device in accordance with the present invention, particularly showing one potential suitable shape for the pole pieces.

FIG. 6 indicates the design of the pole pieces 12, 13 shaped in accordance with the variation of the field strength H around the perimeter of the magnetic discs 10, 11. The application of the inverse square law of magnetic fields achieves good results but specific materials and applications they influence the optimal shape. In particular, the wall thickness of the poles may be varied as follows:

(a) oval poles, where the wall thickness is a mathematical function of the field strength of the perimeter of the magnets;
(b) oval poles, where the wall thickness is a mathematical function of the distribution of the magnetic mass of magnets 10 and 11;
(c) round pole pieces, where the wall thickness is constant and the magnetic field strength is lower but uniform around the perimeter.

The shape of the outer casing of the housing shown in FIG. 6, being an oval-shape, maximises the external field strength and assists in holding the device in place in incomplete magnetic circuits. Incomplete magnetic circuits are met in practice when there is an air gap between the bottom of the device and the surface to which it is to be attached, or were there is a non-magnetic material interposed between the surface to which the device is designed to be attached and the bottom of the device.

It is another feature of preferred embodiments of the present invention that the poles are of the shortest possible length. The poles form part of the magnetic circuit (along with the magnets). The poles have an inherent magnetic resistance ("reluctance") which results in loss of magnetic energy. Thus, the present invention, in minimising the length of the poles, minimises loss of magnetic energy and hence maximises the external field strength.

It has also been found that the required torque to shift the upper magnet 11 to the "on" position decreases markedly with the increase of magnetic flux through the external circuit. An added feature is therefore a torque sensitive lever which will only allow the device to be switched to the "on" position if an appropriate external magnetic circuit is present.

The present invention utilises an "active" shunting technique wherein the magnetic circuit is switched from a strong external field to a weak external field by performing a magnetic short circuit using the magnets themselves. The passive poles can be reduced to a minimum of mass which, in turn, is a prerequisite for retaining the highest possible magnetic force. This should be contrasted with "passive" shunting, as disclosed in the Yanagisawa reference cited earlier, in which passive ferromagnetic external poles establish a magnetic short circuit between the poles of the permanent magnet. A strong permanent magnet requires relatively large amounts of passive material to perform this shunting.

The present invention, in its preferred embodiments, also has the advantage of having very low friction between the magnets and around the magnets and between the magnets and the poles. This is a result of the symmetrical pull between the cylindrical magnets and the poles and the walls of the housing, resulting in a zero net attraction.

The preferred embodiments of the present invention also make greater use of the area under the B-H curve. The use of shorter pole lengths also reduces the reluctance of the poles, thereby minimising magnetic losses through the poles.

It is a further advantage of preferred embodiments of the present invention that the bulk of the field lines are directed through the pole pieces to the workpiece or surface.

The switchable magnetic device of the present invention provides a compact and rugged device capable of many uses. The use of diametrically polarised, essentially cylindrically shaped magnets allows the device to be compact and it also enables the magnets to be rotated relative to each other without the necessity of having larger void spaces within the internal chamber for the magnets to be moved into. The shape of the external pole pieces enables the external magnetic field to be maximised. The device is simple to use and can provide a strong holding force to hold objects firmly in place.

The second, third, fourth and fifth aspects of the present invention have been developed following further studies conducted by the present inventors on the switchable magnetic device described in the first aspect of the present invention. These studies have shown that the force required to turn the switchable magnetic device from the "off" to the "on" position varies with the permeability of the external magnetic circuit. In particular, the force required to switch the device into the "on" position from the "off" positions when there is no external magnetic circuit is much greater than the force required to switch the device into the on position when an external magnetic circuit is present. An external magnetic circuit may be present, for example, when the device is placed in contact with or close proximity to an external ferromagnetic material. FIG. 7 shows a graph of the relative force required to turn the actuation means of the switchable magnetic device described with reference to FIG. 5 versus angular displacement. As can be seen from FIG. 7, the force required to switch the device into the "on" position (which is represented at an angular displacement of 180° in the graph of FIG. 7) is high if the external magnetic permeability is low due to the high intrinsic magnetic field strength of the device. Work has to be performed to overcome the resistance produced by this intrinsic magnetic field. Rotation of the magnets converts mechanical energy to magnetic potential energy stored in a high flux density repulsion field between the poles.

FIG. 8 shows the same graph as FIG. 7, but with the switchable magnetic device being in the presence of a low external magnetic reluctance path. This may be achieved, for example, by placing the device in contact with, or in close proximity to, an external ferromagnetic material, such as occurs when the magnet is used to attach to an external load. As can be seen from FIG. 8, although the general shape of the graph is similar to that of FIG. 7, the relative force required to move the magnets between the off position and the on position is much lower than the force required in FIG. 7. The force required to move the magnets between the off and on positions in FIG. 8 is lower than that in FIG. 7 because the external magnetic circuit results in the magnetic flux finding an easier external path which diverts some of the magnetic flux from between the repelling poles.

In both FIG. 7 and FIG. 8, an angular displacement force tries to move the magnets towards 0° or 360° (ie the fully off position) except at 180° (ie the fully on position) at which clockwise and counter clockwise forces hold a balance, albeit an unstable or quasi-stable equilibrium.

In the second aspect of the present invention, which includes a biasing means operatively associated with the actuation means to bias the magnets away from the fully off position, when the switchable magnetic device has no external magnetic circuit, for example, where the device is not in contact with, or in close proximity to, an external ferromagnetic material, the force required to shift the device from the off position to the on position is relatively high. The biasing means applies a force to the actuation means but this force is lower than the force required to move the actuation means to the on position in the absence of the external magnetic circuit. However, closing the external magnetic circuit will reduce the force required to move the device into the on position. As a result, correct selection of the biasing means will result in the force applied to the actuation means by the biasing means being sufficiently large to move the device to the on position. As a result, when the device in accordance with the first aspect of the present invention is placed in close proximity to or in contact with an external ferromagnetic material, the device automatically switches to the on position. Thus, the device of the second aspect of the present invention may be said to have an automatic turn on feature.

In the apparatus of the second aspect of the present invention, the biasing means acts to hold the actuation means away from the fully off position. For example, the biasing means may apply a force F as shown in FIG. 9, which biases the actuation means away from the 0° or fully off position, when there is no external magnetic circuit present. In the example of in FIG. 9, the biasing force F applied by the biasing means holds the actuation means at about 30° from the fully off position when there is no external magnetic circuit. When an external magnet circuit is closed, force F is greater than the force F1 required to move the magnets and hence the device automatically moves to the on position. Put in slightly different terms, the biasing means applies a rotational force F to the magnets. In the absence of an external magnetic circuit, a maximum force F2 is required to move the device to the "on" position. As F is less than F2, the device does not move to the "on" position in the absence of an external magnet circuit. However, once all external magnetic circuit is in place, the maximum force that needs to be applied to move to the "on" position reduces to F1. As the force F provided by the biasing means is greater than F1, the device automatically moves to the "on" position when an external magnetic circuit is completed.

The embodiments in accordance with the third and fourth aspects of the present invention, in which the magnets are prevented from rotating to the fully on position, may be described as including an "automatic off" feature in which the device automatically turns off if it is removed from an external magnetic circuit, for example, by removing it from an external ferromagnetic material. This action may be explained with reference to FIG. 10, which is a plot of angular displacement against the relative force, together with FIGS. 11 & 12. Plot A shows the force for the case where there is no external magnetic circuit and Plot B shows the force where there is an external magnetic circuit.

For the device to operate in the automatic reset mode, it may utilize the internal friction of the device, or a purpose built overridable retaining device may be used. The reset feature is triggered when the external magnetic path is interrupted.

FIG. 10 illustrates the applicable forces in an embodiment of the automatic reset configuration relying on the internal friction of the device. In this embodiment it is assumed that the device is switched on to, say, 175°, (FIG. 12), ie, it is not in the 180° quasi-equilibrium position. Thus there is a reverse magnetic force, W (FIG. 10), acting to turn the magnetic switch off, assuming there is a low reluctance external magnetic path in place and the Plot B represents the repulsive magnetic force between the magnets in this condition. The internal friction at 175° shown at X. This frictional force acts against the repulsive magnetic force W, and because the frictional force is greater than W, the switch remains in the 175° position as long as the low reluctance path is in place. If the external low reluctance path is broken, the repulsive force between the magnets is now shown by Plot A. Thus the repulsive force now becomes Y, which is greater than X. As a result, the movable magnet is driven towards the off position until the repulsive magnetic force of Plot A and the frictional force are in equilibrium at Z.

While the friction line is shown as a straight line, the friction force may vary with rotation due to, eg, the effect of the change in the magnetic interaction between the magnets with position. Other factors besides function (such as inertia of the magnet(s) may also assist in retaining the device in the on position when in the presence of an external magnetic circuit.

Where a larger or more precise control of the reset action is required, a trippable latching mechanism which will yield under the Plot A magnetic repulsion, may be used. One embodiment of such a latch is similar to a triangular sectioned spring loaded door latch with a perpendicular "leading" edge in the turn on direction, and a sloping trailing edge. This can engage with a suitable recess, at the desired angle of rotation (eg, 175°) on the other part of the relatively moving pair of magnets or their respective carriers. The spring tension can be adjusted to control the automatic turn off force while providing a more predictable latching force.

In another embodiment of the invention, the switchable magnetic device incorporates the automatic on feature of the second aspect of the present invention and an automatic off feature of one of the third or fourth aspects of the present invention.

In preferred embodiments of all aspects of the present invention, the permanent magnet and the second permanent magnet are essentially cylindrically shaped.

Preferably, the first and second magnet are substantially disc-shaped. Most preferably, the first and second magnets are essentially cylindrical in shape and the height of the cylinder is less than the diameter of the cylinder. It will be appreciated that the first and second magnets need not be exactly cylindrical and that slight variations from a circular cross section also fall within the scope of the present invention. The height of the magnets may vary over a wide range, and the ratio of diameter to height may also vary over a wide range.

The first and second magnets may be essentially identical to each other

Alternatively, the first and second magnets may have deficient properties. The magnets may have the same or different physical dimensions to each other. Varying the magnetic properties or the physical dimensions of the first and second magnets can be used in some embodiments of the invention to vary magnetic switching properties.

In embodiments of the second aspect of the present invention, the biasing means operatively associated with the actuation means preferably comprises one or more springs. Alternatively, the biasing means may comprise air pressure means, pneumatic means, bimetallic spring or indeed any other suitable means for applying a biasing force.

It is preferred that the biasing means applies a biasing force such that the first and second magnets are offset by about 10° to 60°, more preferably 20° to 40°, most preferably about 30° from the fully off position.

In embodiments of the second or third aspects of the present invention, the rotation limiting means may comprise a stop means preventing rotation of the actuation means to the fully on position. Alternatively, the rotation limiting means may comprise stop means inter-engaging with one or both of the first and second magnets for preventing rotation of the first and/or second magnets into the fully on position. In this embodiment, the stop means may comprise a retractable engaging member that moves into a recess formed in a surface of one of the magnets when the recess moves into alignment with the retractable member as the magnet is rotated towards the on position. When the magnet rotates back towards the off position, an inclined or tapering surface may be provided in order to enable the retractable member to be disengaged from the recess in the magnet.

Figure 11:
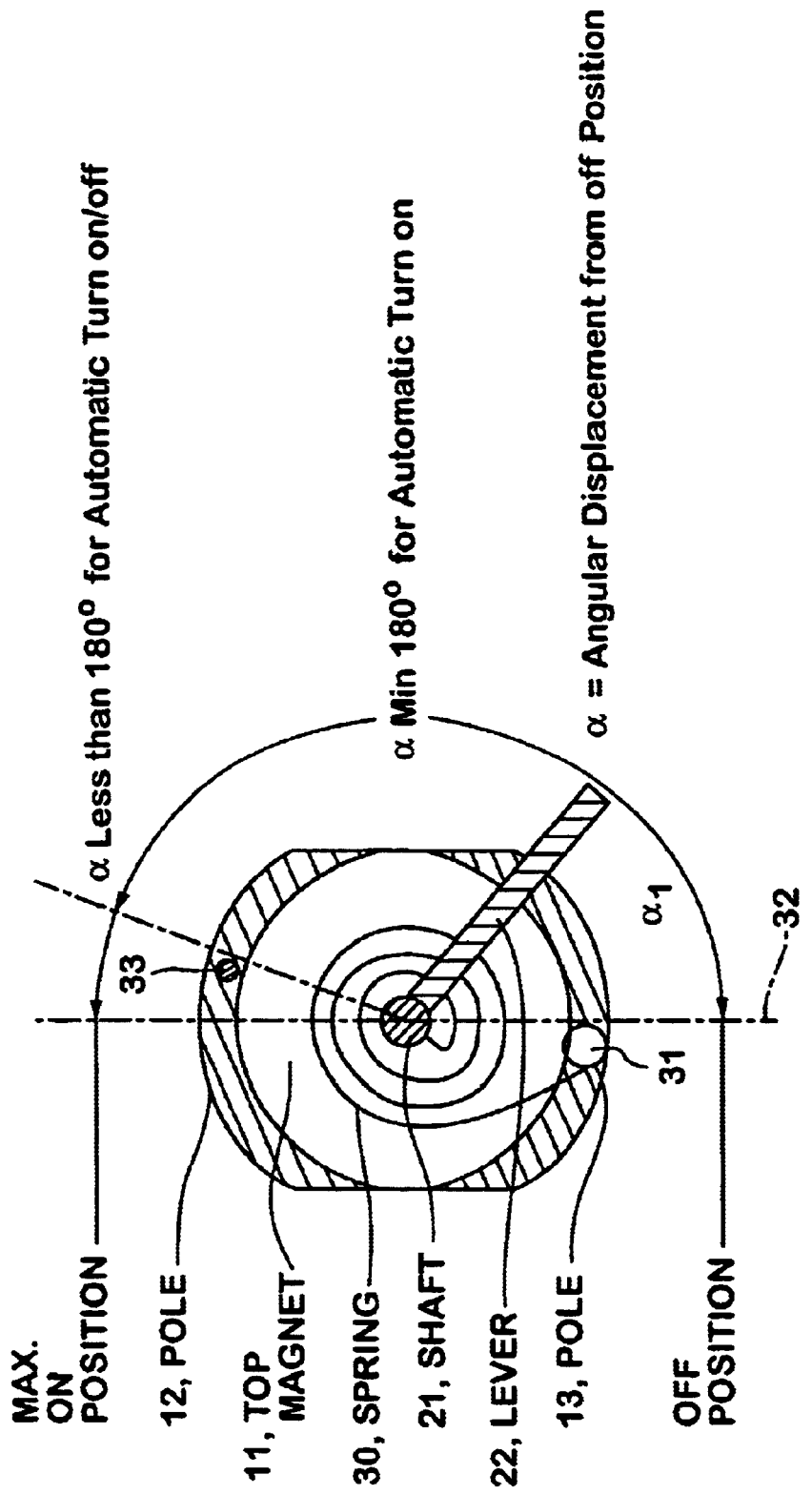
FIG. 11 is a top view, partly in cross-section of a switchable magnetic device in accordance with the present invention.
Figure 12:
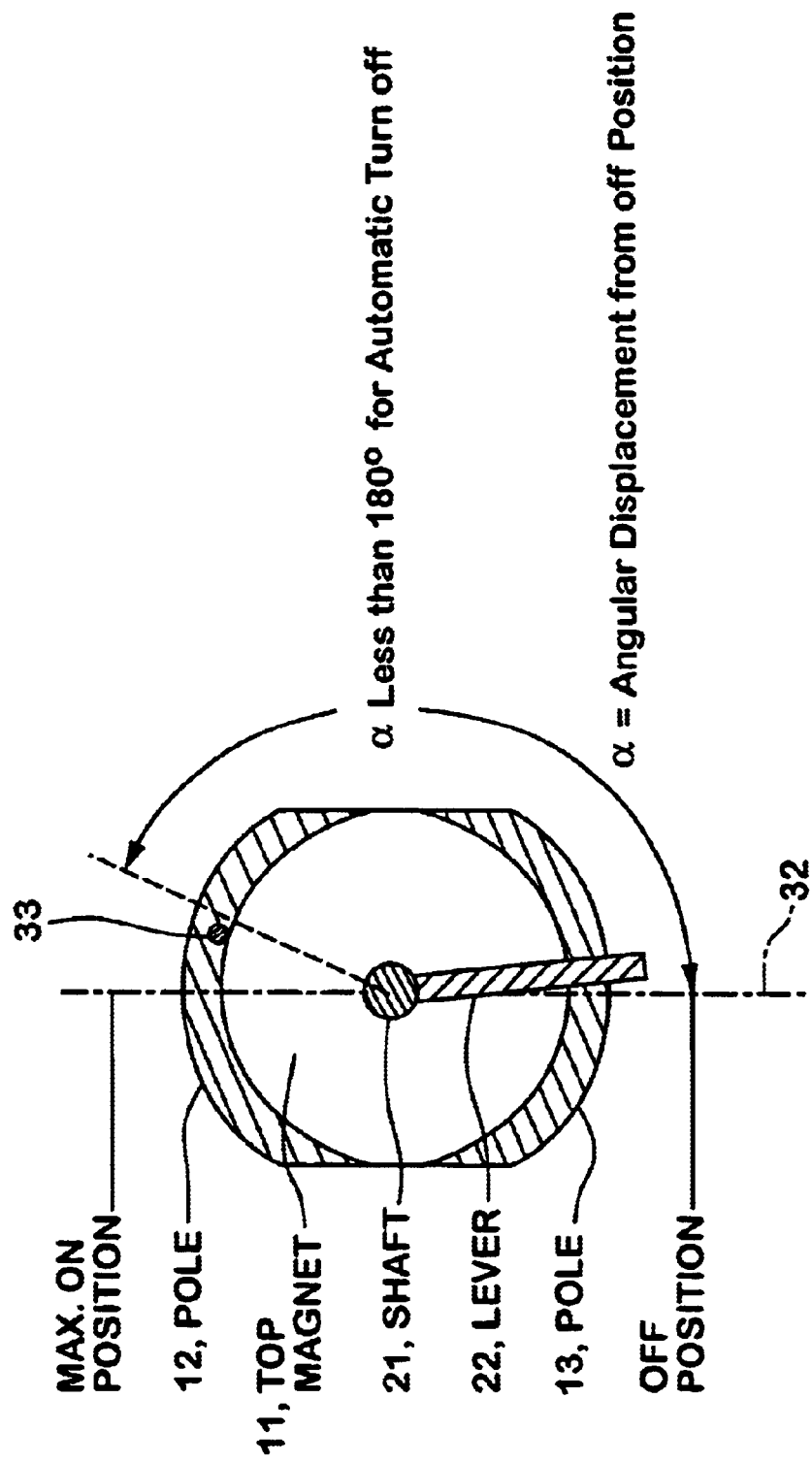
FIG. 12 shows a top view of a switchable magnetic device in accordance with the third and fourth aspects of the present invention.

Turning to FIG. 11, which shows a switchable magnetic device in accordance with the present invention, the basic device of FIG. 11 is generally similar to that shown in FIG. 2 and like features have been denoted by like reference numerals. The device of FIG. 11 also includes a biasing spring 30 in the form of a coil spring connected at one end 31 to pole 13 and at its inner end to the shaft 21. Coil spring 30 biases the shaft 21 such that the shaft 21 is held at an angle α1 of about 30° from the fully off position. The fully off position is denoted by reference numeral 32. It should be noted that α1 is the angle at which the shaft is held by the biasing spring 30 when there is not external magnetic circuit associated with the device. A high reluctance external magnetic circuit leads to a balance between the force provided by biasing spring 30, which tries to turn the device to the on position and the resistance of the internal magnetic field counteracting this force. This results in the device adopting a stable stand-by state. Closing the external magnetic circuit with a sufficiently low reluctance path will lower the internal magnetic field and the force provided by the biasing spring will now be sufficient to switch the device to the on position. If rotation of the lever 22 is permitted to go beyond 180° to a stop member (not shown) at, say 185°, the device will remain in the fully on position if the external magnetic circuit is forcefully removed because the magnetic field will now push the movable magnet against the stop. This may be thought of as the equivalent of a magnetic over-the-centre toggle.

As an alternative adaptation of the apparatus shown in FIG. 11, the device may be provided with a stop member 33 located before 180°, say at 175°, which may be as simple as a projection extending upwardly from the upper surface of the device, which projecting engages with lever 22 as lever 22 is turned towards the fully on position. Stop member 33 prevents the lever 22 from rotating to the fully on position. It is preferred that the lever 22 is allowed to rotate close to but below 180°, which allows the device to almost, but not quite, go into the fully on position. In this case, the device will return automatically to the low external field state if the external magnetic circuit is forcefully removed. While the low reluctance external path is in place, the internal friction may be sufficient to hold the magnet switched on, as discussed with reference to FIG. 10.

The device shown in FIG. 11 includes embodiments of the second aspect of the present invention and embodiments of the third or fourth aspects of the present invention. It will be appreciated that other embodiments of the invention may provide the auto-on feature of the second aspect of the present invention or the auto-off feature of the third or fourth aspects of the present invention.

In some cases, it may be desirable to ensure that the reluctance of the external path is sufficiently low to reduce the turn-on force below a predetermined threshold, indicating that a certain amount of flux has been diverted through the external magnetic circuit. This arrangement is examined with reference to FIGS. 13 & 14.

Figure 14:
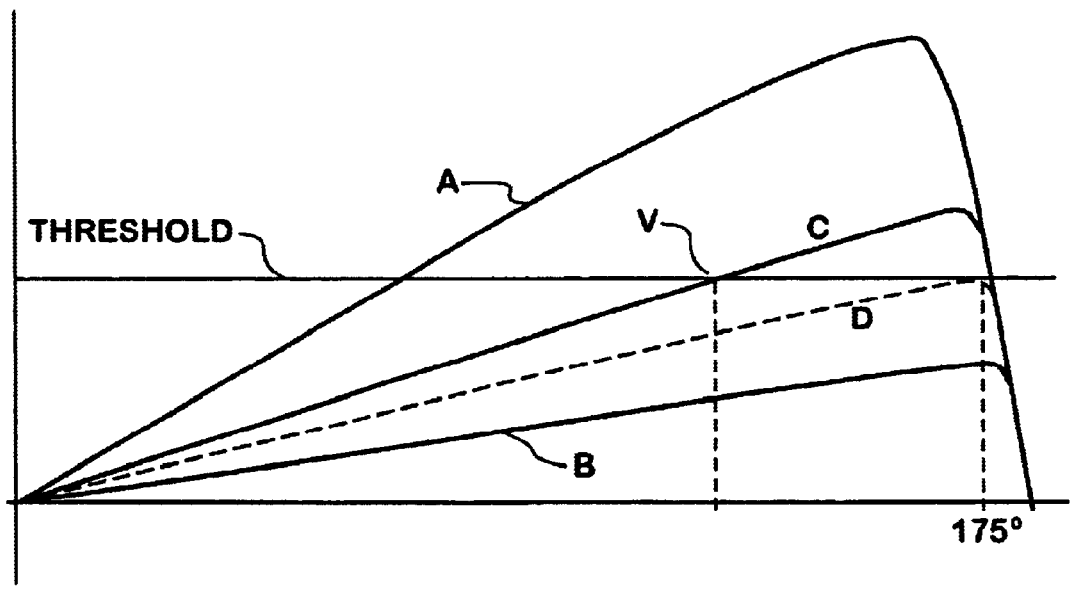
FIG. 14 illustrates the forces involved in a fail-safe arrangement embodying the present invention.
Figure 13:
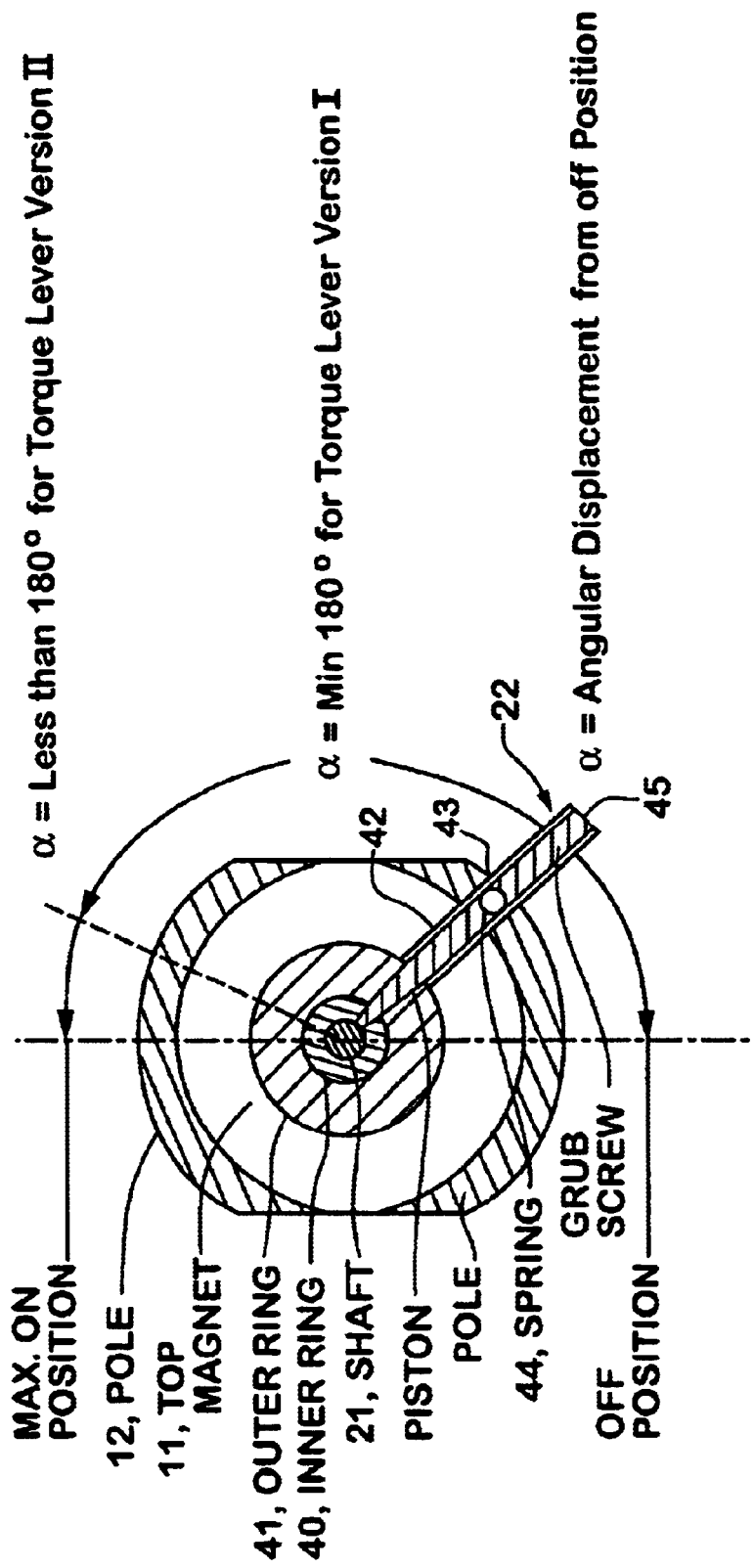
FIG. 13 shows a top view, in cross-section of an embodiment of the invention using a torque sensitive lever as the actuation means.

In a first arrangement of the torque limited switch, the turning mechanism, eg handle or lever, is connected to the movable magnet through a torque sensing spring mechanism as shown in FIG. 13. The relevant forces are shown in FIG. 14. If the required force to overcome the repulsive magnetic force exceeds the threshold shown in FIG. 14, eg as shown at V on Plot C. this is an indication that insufficient flux has been diverted to the external magnetic path or, in other words, the reluctance of the external path is too high. When the force applied to the handle exceeds the threshold, the torque limiting device may act as a lost motion device allowing the lever to continue turning, but preventing transfer of the rotation to the movable magnet.

The handle may comprise a torque sensitive lever that does not allow a torque in excess of a predetermined amount to be applied to the one magnet. In this regard, when there is no external load applied to the device, it requires more force to switch the device between active and inactive states. Use of a torque sensitive lever as part of the actuation means can result in it being impossible to switch the device between the active and inactive states if no sufficient external magnetic circuit is present. This feature may be utilized as a fail-safe feature to prevent an attempt to connect to an object where the magnetic coupling to the object is insufficient to safely lift the object.

FIG. 13 shows an embodiment of the invention utilising a torque lever as the actuation means. In this case, shaft 21 is surrounded by an inner ring 40 and an outer ring 41. Inner ring 40 contains a recess for receiving the pointed end of a piston 42. Outer ring 41 includes a passageway through which the piston 42 passes. Piston 42 is contained within an outer casing 43. Piston 42 is spring loaded by virtue of compression spring 44 which is positioned inside casing 43 and extends between piston 42 and adjustable grub screw 45. If an attempt is made to turn the lever 22 without an external magnetic circuit being present, the resistance to turning caused by the internal magnetic field of the device results in the force applied to the lever 22 exceeding a present value. This results in the tip of the piston 42 being displaced from the recess in inner ring 40 and the lever then slips together with the outer ring, thus disconnecting the flow of force to the inner ring, which is fixed to the shaft. The top magnet immediately returns to the off state. In this way, a connection between an external magnetic circuit and the controlled turning-on function of the device can be realised.

Figure 15:
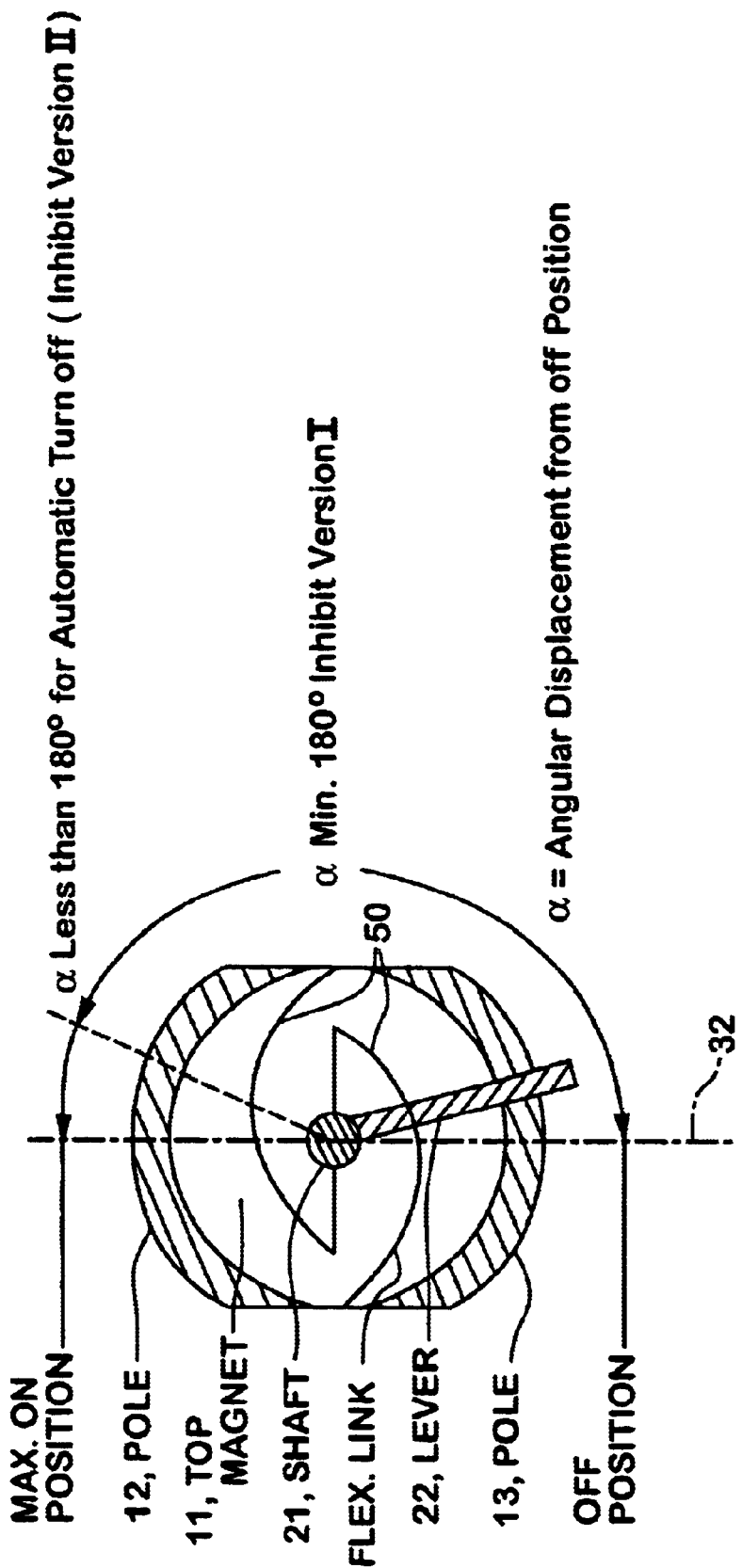
FIG. 15 shows a top view, in cross section, of an embodiment in accordance with the fifth aspect of the invention.

In the embodiment shown in FIG 15, which is one embodiment of the fifth aspect of the present invention, turning handle 22 is connected to the rotatable magnet via a flexible link, such as a spring 50. Spring 50 is selected such that it does not substantially deform if the turning handle 22 is rotated when the device is in the presence of an external magnetic circuit, such as when the device is placed on a ferromagnetic material. However, if the turning handle 22 is operated in the absence of an external magnetic field, the force required to rotate the magnet is much greater (see FIG. 7) and the spring 50 deforms. This results in the turning handle rotation being taken up by the deformation in the spring 50 and thus the magnet does not rotate. Eventually, the turning handle may be rotated sufficiently far such that the spring 50 is fully deformed (or compressed) and further rotation of the turning handle 22 is translated into rotation of the magnet.

It will be appreciated that the force vs angular displacement diagrams shown in FIGS. 7–10 and 14 have been provided to illustrate the principles involved in the present invention. However, it will also be appreciated that the shape of the force vs angular displacement curves shown in FIGS. 7–10 and 14 is not necessarily correct and the actual shape of the curve may vary from that illustrated.

Figure 16:
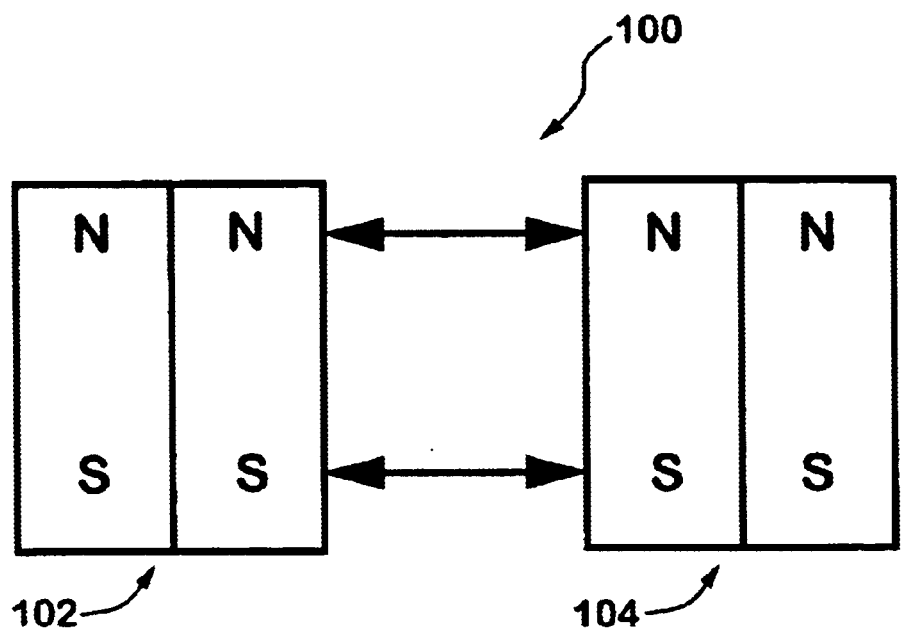
FIGS. 16 and 17 show schematic diagrams demonstrating the principle of operation of coupling in accordance with the sixth aspect of the present invention
Figure 17:
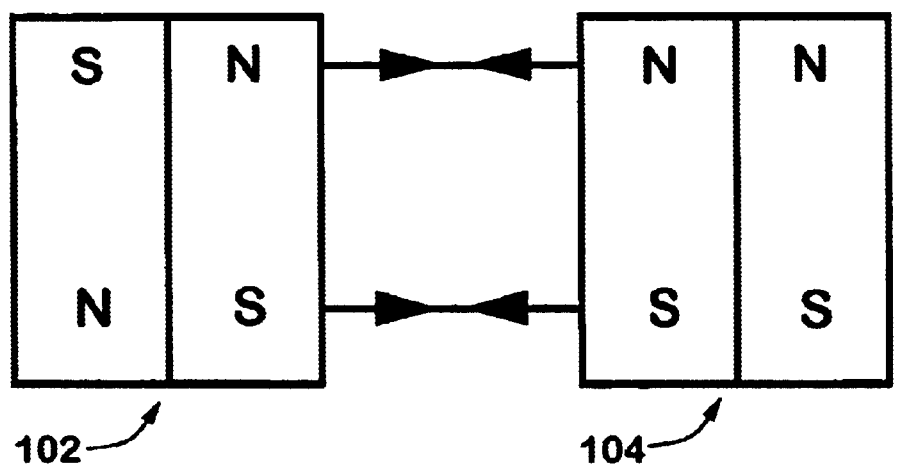

Referring now to FIGS. 16 and 17, which show a coupling in accordance with the present invention, the coupling 100 comprises a first switchable magnetic device 102 and a second switchable magnetic device 104. In FIG. 16, both switchable magnetic devices 102, 104 are in an "on" position. Moreover, it can be seen that devices 102, 104 are arranged such that when they are in the "on" position, their respective north and south poles are in alignment. In the configuration shown in FIG. 16, the two magnetic devices 102, 104 repel each other.

In the configuration shown in FIG. 17, switchable magnetic device 102 has been switched to the "off" position so that it presents a relatively weak or insignificant external magnetic field. As switchable magnetic device 102 includes ferromagnetic material, it is attracted to second switchable magnetic device 104, which is still in the "on" position. Thus, the coupling 100 can actively couple. Switching the switchable magnetic device 102 to the "on" position shown in FIG. 16 will cause repulsion and the coupling will actively uncouple.

The coupling shown in FIGS. 16 and 17 also allows second switchable magnetic device 104 to be switched to an "off" position. If switchable magnetic devices 102, 104 are both switched to an "off" position, the coupling goes into a passive state in which neither attractions nor repulsion occur. If such a passive state is not required, on of the switchable magnetic devices 102, 104 may be substituted by a magnet, such as a permanent magnet.

The first and second magnetic devices should be arranged such that they can move relatively towards and away from each other to allow coupling and uncoupling thereof.

In embodiments where the first and/or second magnetic devices are switchable magnetic devices, they are preferably as described with reference to any of the first to fifth aspects of the present invention.

Those skilled in the art will appreciate that the present invention may be susceptible to variations and to modifications other than those specifically described It is to be understood that the present invention encompasses all such variations and modifications that fall within its spirit and scope.

What is claimed is:

1. A switchable magnetic device comprising a housing having a low magnetic reluctance path, a first permanent magnet, a second permanent magnet, said first and second permanent magnets being essentially cylindrically shaped, said first and second permanent magnets being diametrically polarized, said first and second permanent magnets being mounted within the housing such that the first and second permanent magnets are rotatable relative to each other, and actuation means for causing relative rotation of the first and second permanent magnets, wherein said device presents a relatively strong external magnetic field when said first and second permanent magnets are positioned relative to each other such that a north and south poles of the first magnet are in substantial alignment with respective north and south poles of the second magnet, and the device presents a relatively weak external magnetic field when the first and second magnets are positioned relative to each other such that the north pole of the first magnet is in substantial alignment with the south pole of the second magnet and vice versa.

2. The device as claimed in claim 1, wherein the first and second magnets are substantially disc-shaped.

3. The device as claimed in claim 1, wherein the first and second magnets are mounted in the housing such that a face of the first magnet is opposed to the face of the second magnet.

4. The device as claimed in claim 3, wherein one magnet is positioned above the other magnet.

5. The device as claimed in claim 1, wherein one magnet is fixedly mounted in the housing and the other magnet is able to rotate within the housing.

6. The device as claimed in claim 5, wherein the other magnet is rotated through 180° to vary the device from a state having a relatively strong external magnetic field to a state having a relatively weak external magnetic field.

7. A switchable magnetic device comprising a housing, a first permanent magnet, a second permanent magnet, said first and second permanent magnets being essentially cylindrically shaped, said first and second permanent magnets being diametrically polarized, said first and second permanent magnets being mounted within the housing such that the first and second permanent magnets are rotatable relative to each other, and actuation means for causing relative rotation of the first and second permanent magnets, wherein said device presents a relatively strong external magnetic field when said first and second permanent magnets are positioned relative to each other such that a north and south poles of the first magnet are in substantial alignment with respective north and south poles of the second magnet, and the device presents a relatively weak external magnetic field when the first and second magnets are positioned relative to each other such that the north pole of the first magnet is in substantial alignment with the south pole of the second magnet and vice versa, wherein the housing comprises two pole pieces.

8. The device as claimed in claim 7, wherein the housing is made as a unitary construction or from a single piece of material.

9. The device as claimed in claim 8, wherein two portions of the housing have reduced cross sectional area such that the housing acts as two passive poles.

10. The device as claimed in claim 8, wherein portions of the housing are treated such that the portions become non-magnetic to thereby result in the housing acting as two passive poles.

11. The device as claimed in claim 7, wherein the housing defines a chamber in which the first and second magnets are mounted.

12. The device as claimed in claim 11, wherein the chamber has open ends.

13. The device as claimed in claim 12, wherein one or more chambers closing means close one or more open ends of the chamber.

14. The device as claimed in claim 12, wherein a lowermost of the first magnet and the second magnet closes a lower end of the chamber.

15. The device as claimed in claim 11, wherein the chamber has closed ends.

16. The device as claimed in claim 7, wherein the housing is made from a material having a low magnetic reluctance.

17. The device as claimed in claim 16, wherein the housing is made from soft steel, iron or a permalloy.

18. The device as claimed in claim 7, wherein the pole pieces are shaped to maximize the external magnetic field.

19. The device as claimed in claim 18, wherein the poles are of minimum length.

20. The device as claimed in claim 7, wherein the actuation means comprises a handle or knob connected to one of the magnets.

21. The device as claimed in claim 20, wherein the handle or knob is connected to one of the magnets via one or more intermediate members.

22. The device as claimed in claim 20, in which the handle or knob is actuated manually, electrically, pneumatically, hydraulically or by the action of expansion of a bimetallic strip.

23. The device as claimed in claim 7, wherein the first and second magnets comprise rare earth type magnets.

24. A switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets, wherein in a "fully off" position the north pole of the first magnet is in substantial alignment with the south pole of the second magnet and vice versa such that the device presents a relatively weak external magnetic field and relative rotation of the magnets by 180° moves the magnet to a "fully on" position in which the north pole of the first magnet is positioned in alignment with the north pole of the second magnet such that the device presents a relatively strong external magnetic field, wherein a biasing means is operatively associated with said actuation means to bias said magnets away from the fully off position and wherein placing said device on or in close proximity to a ferromagnetic material causes the first and second magnets to switch to a relative orientation such that the device presents a relatively strong external magnetic field.

25. The device as claimed in claim 24, wherein said relative orientation comprises the fully on position.

26. The device as claimed in claim 24, wherein said first and second permanent magnets are essentially cylindrically shaped, said first and second permanent magnets being diametrically polarized.

27. A switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets wherein in a "fully off" position the north pole of the first magnet is in substantial alignment with the south pole of the second magnet and vice versa such that the device presents a relatively weak external magnetic field and relative rotation of the magnets by 180° moves the magnets to a "fully on" position in which the north pole of the first magnet is positioned in alignment with the north pole of the second magnet such that the device presents a relatively strong external magnetic field, characterized in that wherein said device further includes rotation limiting means preventing said magnets from reaching the "fully on" position.

28. The device as claimed in claim 27, wherein the rotation limiting means limits the relative rotation of the magnets to about 175° relative to each other.

29. The device as claimed in claim 27, wherein said first and second permanent magnets are essentially cylindrically shaped, said first and second permanent magnets being diametrically polarized.

30. A switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets, wherein in a "fully off" position the north pole of the first magnet is in substantial alignment with the south pole of the second magnet and vice versa such that the device presents a relatively weak external magnetic field and relative rotation of the magnets by 180° moves the magnet to a "fully on" position in which the north pole of the first magnet is positioned in alignment with the north pole of the second magnet such that the device presents a relatively strong external magnetic field, wherein relative rotation of the first and second magnets is limited to less than 180° such that said magnets are prevented from reaching the fully on position but said first and second magnets can be rotated to a relative orientation such that the north and south poles of the first magnet are closely but not completely aligned with respective north and south poles of the second magnet such that said device still presents a relatively strong external magnetic field and said device automatically switches to a state where the external magnetic field is relatively weak when said device is removed from contact or removed from close proximity to an external ferromagnetic material.

31. The device as claimed in claim 30, wherein the magnets can rotate about 175° relative to each other.

32. The device as claimed in claim 30, wherein said first and second permanent magnets are essentially cylindrically shaped, said first and second permanent magnets being diametrically polarized.

33. A switchable magnetic device of the kind including a housing, a first permanent magnet, a second permanent magnet, the first and second permanent magnets being mounted within the housing such that the first and second magnets are rotatable relative to each other, and actuation means for causing relative rotation of the first and second magnets, wherein in a "fully off" position the north pole of the first magnet is in substantial alignment with the south pole of the second magnet and vice versa such that the device presents a relatively weak external magnetic field and relative rotation of the magnets by 180° moves the magnet to a "fully on" position in which the north pole of the first magnet is positioned in alignment with the north pole of the second magnet such that the device presents a relatively strong external magnetic field, wherein said actuation means includes a flexible portion that deforms if the actuation means is actuated in the absence of an external magnetic circuit to thereby limit relative rotation of said magnets, said flexible portion having sufficient yield strength to substantially avoid deformation during actuation of said actuation means in the presence of an external magnetic circuit.

34. The device as claimed in claim 33, wherein said flexible portion is a spring link.

35. The device as claimed in claim 33, wherein said flexible portion can be deformed to a maximum extent, after which continued actuation of the actuation means acts to cause relative rotation of the magnets.

36. The device as claimed in claim 33, wherein the magnets can rotate about 175° relative to each other.

37. The device as claimed in claim 33, wherein said first and second permanent magnets are essentially cylindrically shaped and said first and second permanent magnets are diametrically polarized.

38. The device as claimed in claim 1, further including a child-proof lock or child-proof catch type arrangement in the actuation means such that some extra manipulation by a user is required before the magnets can be rotated.

39. The device as claimed in claim 24, including a child-proof lock or child-proof catch type arrangement in the actuation means such that some extra manipulation by a user is required before the magnets can be rotated.

40. The device as claimed in claim 24, further including a child-proof lock or child-proof catch type arrangement in the actuation means such that some extra manipulation by a user is required before the magnets can be rotated.

41. The device as claimed in claim 31, further including a child-proof lock or child-proof catch type arrangement in the actuation means such that some extra manipulation by a user is required before the magnets can be rotated.

42. The device as claimed in claim 33, further including a child-proof lock or child-proof catch type arrangement in the actuation means such that some extra manipulation by a user is required before the magnets can be rotated.

43. A coupling comprising a first magnetic device and a second magnetic device, the first magnetic device being a switchable magnetic device comprising a first permanent magnet and a second permanent magnet, said first and second permanent magnets being movable relative to each other and actuation means for effecting relative movement between the first and second magnets wherein said first magnetic device presents a relatively strong external magnetic field when the first and second magnets are positioned relative to each other such that north and south poles of the first magnet are in substantial alignment with respective north and south poles of the second magnet and the first magnetic device presents a relatively weak external magnetic field when the north pole of the first magnet is in substantial alignment with the south pole of the second magnet and vice versa, said first magnetic device and said second magnetic device being arranged relative to each other such that said second magnetic device attracts the first magnetic device when the first magnetic device presents a relatively weak external magnetic field and said second magnetic device repels said first magnetic device when said first magnetic device presents a relatively strong external magnetic field.

44. The coupling as claimed in claim 43, said second magnetic device comprises a magnet.

45. The coupling as claimed in claim 43, wherein said second magnetic device comprises a second switchable magnetic device and the first and second switchable magnetic devices repel each other when said first and second switchable magnetic devices both present relatively strong external magnetic fields.

46. The coupling as claimed in claim 43, wherein the first magnetic device is movable relatively towards and away from the second magnetic device.

47. A switchable magnetic device comprising a housing, a first permanent magnet, a second permanent magnet, said first and second permanent magnets being essentially cylindrically shaped, said first and second permanent magnets being diametrically polarized, said first and second permanent magnets being mounted within the housing such that the first and second permanent magnets are rotatable relative to each other, and actuation means for causing relative rotation of the first and second permanent magnets, wherein said device presents a relatively strong external magnetic field when said first and second permanent magnets are positioned relative to each other such that a north and south poles of the first magnet are in substantial alignment with respective north and south poles of the second magnet, and the device presents a relatively weak external magnetic field when the first and second magnets are positioned relative to each other such that the north pole of the first magnet is in substantial alignment with the south pole of the second magnet and vice versa, wherein the actuation means includes torque limiting means such that a torque in excess of a predetermined torque cannot be applied to the magnets to cause relative rotation thereof.

48. The switchable magnetic device as claimed in claim 47, the torque limiting means allows slippage of the actuation means if a torque in excess of the predetermined torque is applied to the actuation means.

\* \* \* \* \*

UNITED STATES PATENT AND TRADEMARK OFFICE
CERTIFICATE OF CORRECTION

PATENT NO. : 6,707,360 B2
DATED : March 16, 2004
INVENTOR(S) : Underwood et al.

It is certified that error appears in the above-identified patent and that said Letters Patent is hereby corrected as shown below:

<u>Title page,</u>
Insert Item -- [30]     Foreign Application Priority Data
December 6, 1999   (AU)   PQ4466 --.

Signed and Sealed this

Seventeenth Day of January, 2006

JON W. DUDAS
*Director of the United States Patent and Trademark Office*